United States Patent Office 3,290,922
Patented Dec. 13, 1966

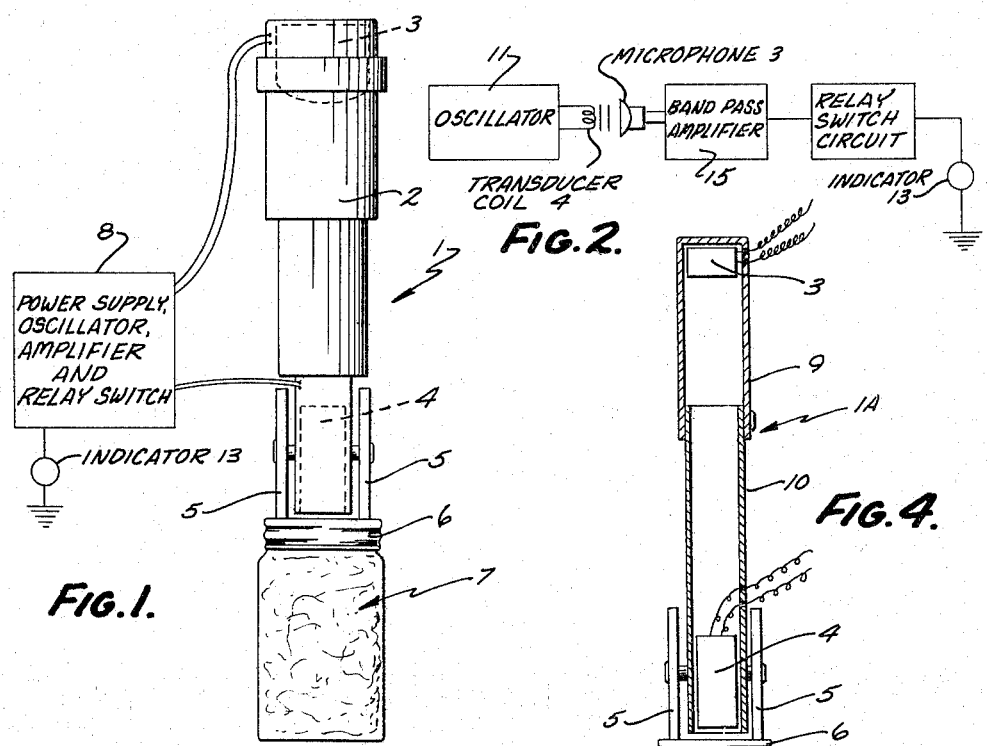
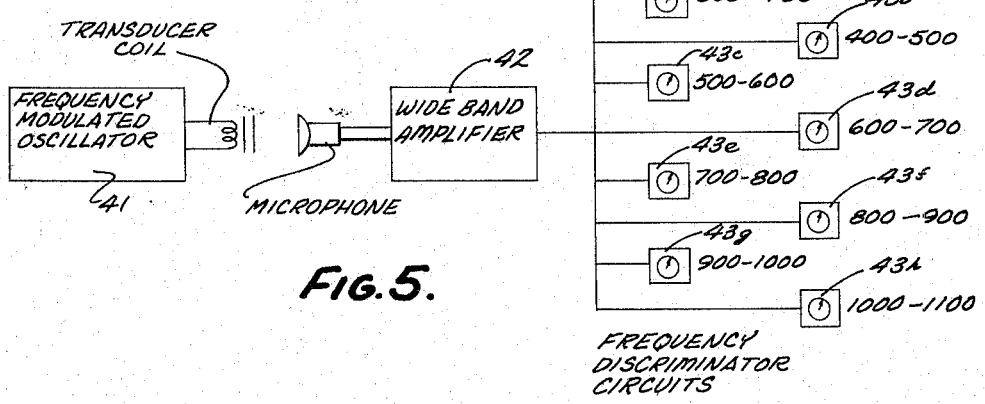

3,290,922
PRESSURE AND VACUUM DETERMINATOR
Robert C. Thompson, Muskegon, Mich., assignor to Techrand Corporation of America, a corporation of Michigan
Filed Jan. 22, 1964, Ser. No. 339,384
14 Claims. (Cl. 73—52)

This invention relates to a method and apparatus for determining fluid pressure in a space enclosed by an enclosure having at least a flexible wall portion. This method and apparatus is capable of determining either positive pressure or vacuum within such an enclosure.

This invention is particularly adapted for determining whether an adequate amount of vacuum is present in vacuum-packed jars having a metal cap, although it should be understood that within the broader aspects of this invention it has many other sundry applications.

The determination of the presence or absence of a desired vacuum in a sealed jar has created quite a problem. Several attempts have been made to solve the problem. One way quite frequently used is to train persons to determine by ear, when the top of the jar is tapped, whether it has the desired vacuum or not. Another way has been to detect by means of a feeler switch the degree of depression in the cap as created by the vacuum. The feeler switch was run over the top of the jar and if the depression or cavity was not sufficiently concave in shape, as created by the drawing down of the cap top by the vecuum within the jar, then the feeler would contact the top giving an indication of this lack of concavity and thus the lack of vacuum within the jar.

It is obvious that these two methods have many disadvantages. The present invention takes an entirely new approach to this problem by providing a source of vibration which causes the top of the jar to vibrate and the energy created by this vibration is then picked up by a microphone and detected. I have discovered that by this means I can determine the presence or absence of a desired vacuum within a jar. Also, this invention can determine within allowable limitations the exact pressure or vacuum within an enclosed space.

Therefore, the object of this invention is to provide a method and apparatus to determine the presence or absence of a vacuum or pressure within an enclosed space.

It is still another object of this invention to provide apparatus and a method for determining the amount of pressure either positive or negative (vacuum) in a container or enclosure.

A more definite understanding of my invention will be obtained from reading the following disclosure which is made in conjunction with the drawings wherein:

FIG. 1 is an elevational view of my apparatus in position on top of a jar for determining the absence or presence of a desired vacuum in the jar;

FIG. 2 is a schematic block diagram of my entire system and apparatus;

FIG. 4 is a modification of the apparatus shown in FIG. 1 disclosing a means for adjusting the cavity to resonance of different size vibrating member;

FIG. 5 is a schematic block diagram of a modified system in which a frequency modulated oscillator is utilized in conjunction with frequency discriminator circuits for specifically determining within certain ranges the amount of vacuum or pressure within the enclosure or container.

Figure 3:
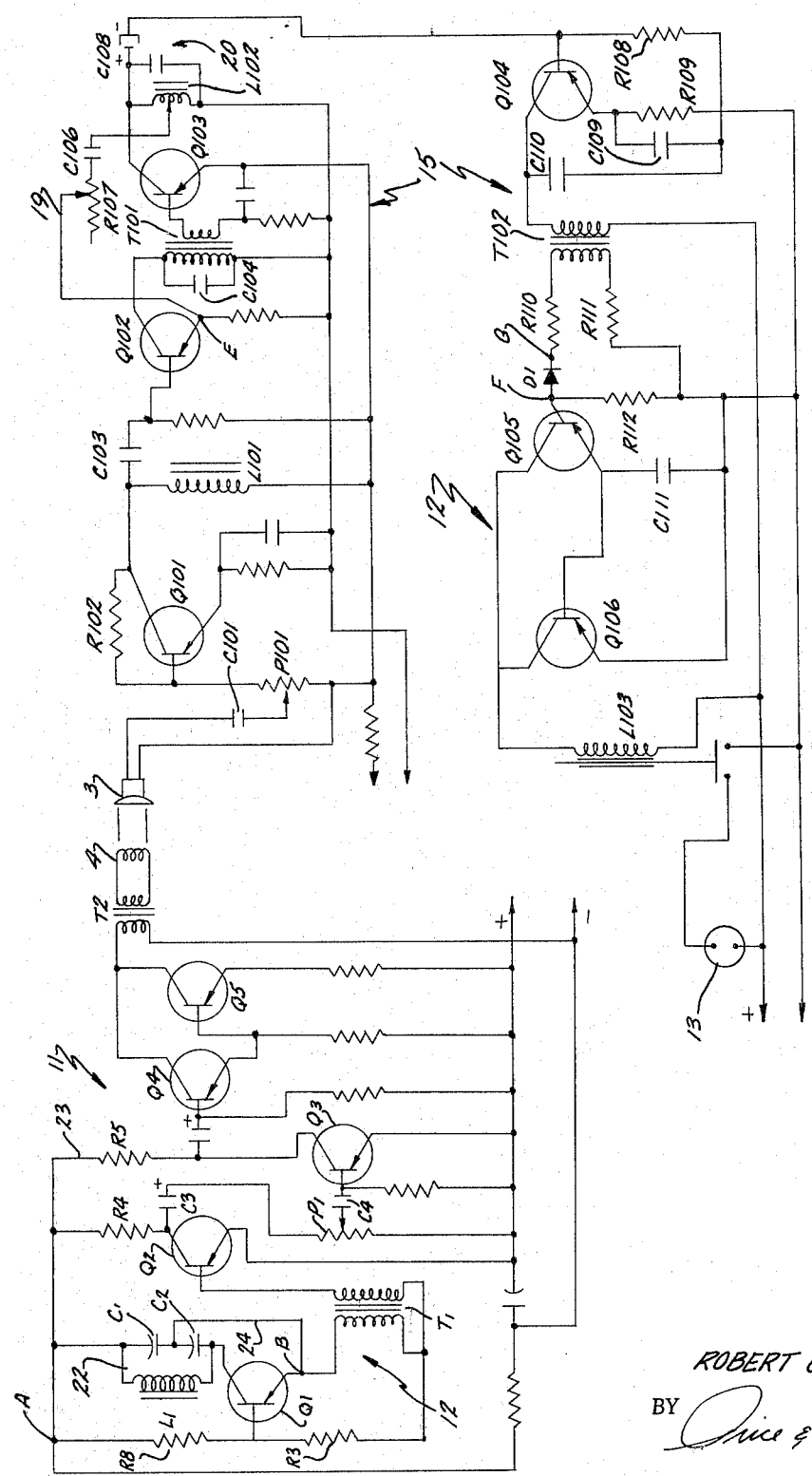
FIG. 3 is a more detailed schematic circuit of my system and apparatus.

Briefly, this invention relates to a method of determining the fluid pressure of a space enclosed by an enclosure having at least a flexible wall portion. This method comprises the steps of motivating the flexible wall portion with a force which causes it to vibrate and then electrically detecting the vibration characteristics to determine the fluid pressure therein.

The apparatus for accomplishing this method includes a force means for causing the flexible wall to vibrate and means for electrically detecting the vibration characteristics of the wall vibrated by this force means. Specifically, the force means is a source of oscillating power connected to a transducer coil. The coil is positioned above the surface of a resilient wall of the container for creating oscillating magnetic force on the wall causing it to vibrate. Pick-up means is located adjacent the transducer coil, preferably above it, for producing signals in response to the vibrating energy generated by the wall. This pick-up means operates a means for indicating the vibration characteristics of the wall over which the coil is positioned.

In one aspect of my invention I provide a frequency modulated source for actuating the coil and a frequency discriminating means connected to the pick-up means for indicating the frequency vibration characteristics of the wall over which the coil is positioned.

In still another aspect of my invention I enclose the coil and the pick-up means within an elongated housing which is adjustable in length so that the pick-up means can be positioned above the vibrating wall at the resonant point. Thus, the position of the pick-up can be adjusted for various resonant points of different frequencies making possible the measuring of a great number of positive or negative (vacuum) pressures within enclosures of which the vibrating wall forms a part.

Before setting forth in detail my exact invention, it should be understood that in the use of the term "pressure" I mean either positive or negative (vacuum) pressure.

Referring specifically to FIG. 1 there is disclosed my detector unit 1 which is constructed of a housing 2 in which is located at its upper end a microphone or pick-up 3 and at its lower end the vibration force applicator coil transducer 4. The unit also has a pair of positioning discs or wheels 5 rotatably mounted on the lower end of housing 1 and adapted to space the transducer 4 of the unit a predetermined position above the cap 6 of the jar 7. A power supply, oscillator, amplifier and relay switch circuit 8 is connected to the unit. As disclosed by the schematic diagram of FIG. 2, circuit 8 includes an oscillator 11 connected to the transducer coil 4, and band pass amplifier 15 connected to microphone 3 and the relay switch circuit 12 which controls the indicator 13.

The transducer coil 4 is of a conventional type which will create an electrical force to attract and detract the metal cap 6. Thus, when an oscillating signal from oscillator 11 is fed to the coil 4 it will cause the top of the cap 6 to flex at a rate equal to the oscillation frequency of the oscillator. It has been discovered that for optimum detection characteristics, the lid should be flexed at one-half the predetermined resonant frequency of a "good" container.

The microphone 3 is preferably of the carbon or crystal type since I have discovered that the dynamic, or moving coil type microphone and the magnetic microphone are both adversely affected by the stray currents or field of the transducer coil.

The housing 2 supports the pick-up or microphone 3 directly above the transducer 4 and in effect functions as a wave guide to guide or direct the sound waves created by the vibrating top of cap 6 to the microphone 3. In the embodiment of FIG. 1, the microphone 3 is mounted at a non-adjustable distance from the cap 6. This distance is determined by the natural resonant frequency of the cap top of a good container. For example, for one particular jar construction having a resonant sound frequency of 850 cycles, when the jar is under a desired vacuum, the flexing or oscillating frequency should be 425 cycles and the spacing of the microphone 3 from the cap 6 must be approximately 10 inches in order to pick up the maximum signal. This embodiment of FIG. 1 is particularly adapted for determining the absence or presence of a desired pressure within the jar 7.

FIG. 4 shows a modified unit 1A in which the spacing of the microphone 3 from the cap 6 is adjustable. This is accomplished by providing the two telescoping parts 9 and 10. Microphone 3 is mounted for movement with part 9 as it is adjustably telescoped over part 10. The adjustment of the spacing of microphone 3 from cap 6 permits optimum pick-up of the resonant frequency sound waves of the vibrating top of cap 6. As will be described in detail hereinafter, this adjustment of microphone 3 has several useful purposes.

FIG. 3 discloses in more detail the oscillator, band pass amplifier, and relay switch circuits. This figure shows the oscillator 11 composed of five electronic stages. The first stage 12 is essentially a transistorized version of the Colpitts electron tube oscillator. This stage includes the transistor Q1 having a tank circuit 22 connected to its collector. This tank circuit 22 is composed of the inductor L1 and the capacitors C1 and C2.

The excitation voltage appearing at the base of transistor Q1 is the resultant of a portion of the outputs from the second and third stages (which comprise a D.C. biasing component and an inverse or degenerative A.C. feedback component), fed back to the first stage through the loop 23 and the voltage divider network resistors R2 and R3, together with the amplified signal from its own collector, regeneratively fed back through the tank circuit 22 and the voltage divider network resistors R2 and R3. The loop 24 from the emitter of transistor Q1 to the junction of capacitors C1 and C2 within the tank circuit serves to transfer energy from the transistor to the tank circuit 22 to sustain its oscillation in the presence of the inherent losses of the reactive components of the tank, and also provides the output from this stage at its junction B to the primary of coupling transformer T1.

In operation, the tank circuit 22 will continuously oscillate at its resonant frequency, as determined by the reactances of capacitor C2 and inductor L1. The resultant of the voltages applied to point A of the first stage serves to excite the base of transistor Q1, driving it alternatively between saturation and cutoff.

The output of the first stage, taken from the emitter at point B, thus appears at the primary of transformer T1 in the form of generally half-wave pulses which occur at the continuous frequency desired, due to the combined circuitry which goes to make up the first stage.

Due to the transformer action of transformer T1, the regular pulses impressed upon its primary appear at the secondary as a generally sinusoidal voltage of constant amplitude and sustained continuous frequency, which serves to excite the base of transistor Q2, the second stage of the oscillator circuit 11. Transistor 32 is biased in a conventional manner, and serves to supply a portion of the direct bias voltage and degenerative feedback to the first stage through the loop 23, as previously discussed, developing the same across resistor R4. The steadily oscillating output of the second stage is connected through condenser C3 to potentiometer P1, which serves to develop the output voltage of transistor Q2, as well as to adjust the circuit output voltage appearing at the primary of transformer T2.

The portion of the sustained oscillatory frequency selected by the positioning of potentiometer P1 is then connected through coupling condenser C4 to the base of transistor Q3. This third stage, like the second, is biased in a conventional manner, and complements the function of the second stage in supplying direct biasing and degenerative alternating voltages through loop 23 to the first stage, using resistor R5 as a signal developing load.

The output from the collector of transistor Q3 in the third stage is coupled to the transistor Q4 of the fourth stage through capacitor C5. The transistor Q5 of the fifth stage is directly coupled from the fourth stage. This fifth stage provides to the primary of the circuit output transformer T2 a sustained alternating voltage at a steady and continuous frequency of 420 c.p.s. which in turn is impressed on transducer coil 4.

The vibrations produced by the vibrating wall of the object being tested are picked up by the microphone 3 which produces a corresponding signal voltage. This signal is connected through coupling capacitor C101 to a band pass regenerative amplifier 15 at its input potentiometer P101.

The band pass amplifier 15 is composed of multiple amplification stages and contains appropriate tuning circuitry so as to selectively amplify a desired narrow band of predetermined frequencies, while rejecting those frequencies above and below this band. This band of frequencies has a peak frequency twice the frequency of the oscillator since the sound waves picked up by the microphone when the metal wall is vivrated are twice the oscillator frequency.

Stage 1 of the amplifier, represented by transistor Q101 and its interconnecting circuitry, features an inverse feedback loop from collector to base through resistor R102, which serves to bias the amplifier and guard against distortion. The output of the first stage of amplification is fed through coupling capacitor C103 to the second stage, composed of transistor Q102 and its essentially standard amplifier circuitry configuration. Capacitor C103, in conjunction with the choke L101, forms a high pass filter which is designed to resonate at a point considerably below the band of frequencies desired to be amplified, thus rejecting all frequencies below this point, and allowing all those above to pass onward to the second stage. The frequencies admitted to the second stage are therein amplified and directed to the primary of transformer T101.

The primary winding of transformer T101 is tuned by capacitor C104, so that in conjunction they present a parallel resonant, or tank circuit which will develop into output voltage only those currents from the collector of transistor Q102 which correspond to the desired frequency band. The amplified signal is coupled across the transformer T101 to the base of the third stage transistor Q103, which provides further amplification. The collector circuit of this third stage is similarly loaded by a tank circuit 20, tuned to resonate at the desired frequency, and therefore tending to develop as output voltages of this stage only that frequency. A regenerative feedback loop 19 is provided from the third to the second stage, which couples a portion of the tuned output of the third stage from the tapped choke L102 within the tank circuit 20 through the capacitor C106 and the rheostat R107 to the emitter of the second stage transistor at circuit connection E. The windings of transformer T101 are such that this feedback is in phase with the amplifying currents normally found at point E, and since the feedback current is of the narrow band of frequencies for which the tank 20 is tuned, they serve to strongly regenerate the amplifier at this frequency.

The output from the third stage is fed through coupling capacitor C108 to the base of transistor Q104, the fourth stage amplifying transistor. The amplified output of the fourth stage is developed across a tune load consisting of the primary winding of transformer T102 and capacitor C110, which go to make up a tank circuit. In this manner the voltage appearing at the secondary of transformer T102 will consist of the highly amplified narrow band of frequencies selected from the range of frequencies originally picked up by the microphone 3 due to the highly selective amplification of the total amplifier 5.

The selectively amplified band of frequencies appearing across transformer T102 are received finally by the dual output stage or relay switch circuit 12. In this circuit the diode D1 is biased at its anode at a slightly lower potential, due to resistors R110 and R111, than it is at its cathode, biased by resistor R112. Under this condition, diode D1 will conduct only when the signal appearing across the secondary of transformer T102 rises negatively, since the resultant of signal voltage plus bias voltage at point G now is greater than the reverse biasing voltage at point F. Thus, when the alternating signal voltage approaches zero and goes through its positive half-cycle, the reverse bias at point F will once again cut off conduction through diode D1. The input signal voltage to the base of transistor Q105 is therefore in the form of negative half-cycle waves.

When the output circuit 12 is in its quiescent state, receiving no alternating signal from the band pass amplifier 15, its operation is as follows: the base of transistor Q105 is biased positively by the voltage appearing at point F which serves also to maintain diode D1 at cut-off. The base of transistor Q106 is biased by the resultant of the positive voltage supplied through the conducting transistor Q105, and the negative voltage whose presence is due to the charged capacitor C111. Under this condition transistor Q106 conducts moderately, thereby providing the positive increment of its own base bias voltage through the conducting transistor Q105, as previously discussed, and also provides a small current in its output load L103.

When the negative half-cycles of signal voltage appear on the base of transistor Q105 through the action of diode D1, as discussed previously, these negative half-cycles subtract from the normal positive bias appearing at this point, and their total is such that transistor Q105 is driven alternatively between cutoff and its quiescent state, just discussed. During the interval when transistor Q105 is cut off, the base of transistor Q106 is biased solely by the negative voltage produced by the corresponding charge on capacitor C111. Transistor Q106 saturates, and delivers its maximum output across the load L103. Since this condition is produced only during the time a negative half-cycle of signal voltage is applied to the base of transistor Q105, and since there is only the low level steady state current flow in load L103 during the portion of time when no signal voltage is applied to the base of transistor Q105, as is the case between any two negative half-cycles of signal voltage, when the microphone 3 and the band pass amplifier 15 are excited by the desired band of frequencies, the condition found in the load L103 of the relay circuit 12 is a steady series of very strong pulses of positive direct current.

The load L103 of the relay circuit 12 is the energizing coil of a relay, whose contacts serve to control the energy supplied to the indicating lamp 13 and/or any other control device. When the microphone 3 and the amplifier 15 do not sense the desired band of frequencies, or when they do sense the said frequencies but the output circuit lies quiescent between the negative half-cycles of signal supplied to it, the energization of the relay coil (i.e., the output circuit load L103) is maintained at a level which is too low to actuate the relay contacts, and so the light remains off. During the portion of time the output circuit is under the influence of the negative half-cycles of alternating signal, however, the pulses of direct current through load L103 are very strong, and supply sufficient energy to actuate the relay contacts and light the signal light and/or actuate any control device. Thus, when the desired band of frequencies is present within the amplifier 15 and detected by the relay circuit 12, the indicating light 13, being directly controlled by the relay contacts, will flash an indication of its presence. Under all other conditions the indicating light will remain off.

*Operation*

Having described the apparatus of this invention, its operation should be evident. The unit is placed near a resilient wall of the container for determining the pressure within the container. In the example shown, this wall is the top of the cap 6. When so placed, the wheels or discs 5 may be used to contact the top wall of the cap spacing the transducer coil 4 and the microphone 3 a predetermined distance from the top of the cap. The oscillator 11 which is set for a predetermined frequency causes the coil to flex the top of the cap at the oscillating frequency. This causes the top of the cap 6 to vibrate and set up sound waves which travel inside the housing 2 to the microphone 3.

I have discovered that all caps for jars of the type described have a natural resonant frequency and this resonant frequency changes with the amount of negative or positive pressure inside the jar. For example, I have determined that for one particular jar construction without vacuum the natural resonant frequency is 420 cycles and when the jar is under vacuum the natural resonant frequency is 1010 cycles. Accordingly, to determine whether the jar is under vacuum or not, the lid is flexed by the oscillator and the sound waves resulting from the flexing picked up by the microphone. If the predominate sound waves have a frequency approximately equal to 1010 cycles as determined by the band pass amplifier arrangement, the vacuum within the jar will be correct indicating the contents to be good. The flexing oscillator frequency is preferably set at 505 cycles for optimum signal output when the desired degree of vacuum exists within the container. It should be understood that the resonant frequency varies with the diameter of the jar cap and as the vacuum in the jar is increased the tension on the cap increases and the resultant resonant frequency increases. This is also true for positive pressure.

Having discovered the above phenomena, it should become obvious that the top of the cap 6 will resonate at a predetermined frequency only if a predetermined pressure exists within the container or jar 7. When the jar is under this pressure the microphone produces a maximum output signal when the oscillating or flexing frequency is one-half of the resonant frequency. The band pass amplifier is set to pass only a narrow band of frequencies above and below this resonant frequency. Also, the relay switch circuit 12 is responsive only to this band of frequencies so as to produce a signal at the indicator 13.

If the pressure within jar 7 is not at the desired vacuum or pressure, the sound waves produced by the vibrating top of the cap 6 and the signals generated by the microphone 3 will not fall within this band of frequencies. As a result, the signals generated by the microphone 3 will not be amplified by the amplifier 15 and no indication will appear at the indicator 13.

If the oscillator 11 is set at a predetermined oscillating frequency, the movement of microphone 3 by means of the structure of FIG. 4 will change its output. At one position of microphone 3 maximum output will occur. For each different frequency the position of microphone 3 at maximum output will be different. Therefore, the structure of FIG. 4 permits adjustment of the position of the microphone for different frequency settings of the oscillator 11 and band pass amplifier 15.

*Modification*

FIG. 5 shows a modification in which a frequency modulated oscillator 41 is substituted for the oscillator 11 of FIGS. 2 and 3. Also, a wide band amplifier 42 and a plurality of frequency discriminator circuits 43a, 43b, 43c, 43d, 43e, 43f, 43g and 43h are substituted for the band pass amplifier 15, relay switch circuit 12, and indicator 13. Circuits of this type are well-known. It will be noted that the frequency discriminator circuits discriminate or select certain predetermined frequencies.

For example, frequency discriminator circuit 43a selects frequencies between 300 and 400 cycles, frequency discriminator circuit 43b selects frequencies of between 400 and 500 cycles, etc. Thus, these frequency discriminator circuits will show a signal only when the wide band amplifier amplifies signals of frequencies falling within their particular range.

The operation of the system shown in FIG. 5 is quite similar to that of FIGS. 1 through 3. The frequency modulated oscillator impresses a signal on the transducer coil which causes the top of the jar cap 6 to flex at frequencies determined by the modulation frequency of the oscillator. The microphone picks up the sound waves created by the vibration of the jar cap 6 and the output of the microphone is amplified by the wide band amplifier 42. As previously stated, the frequency discriminator circuits will show a signal if the amplified output of the microphone falls within the frequency range of the discriminator circuit. As a result, if the microphone is picking up a resonant frequency one of the frequency circuits will show the approximate resonant frequency of the top. The construction of FIG. 4 is particularly useful in the system of FIG. 5 because the microphone can be adjusted to a suitable range as will be indicated by the frequency discriminator circuits and accordingly the pressure within the jar can be determined since it has a direct relationship with the resonant frequency of the top of the jar cap.

It should be understood as previously stated that although I have described this invention in relation to the determination of the fluid pressure within a jar, this invention should not be limited to this particular application. The method, device and apparatus of this invention has many applications for determining the pressure within a container. The only prerequisite is that the area enclosed have a resilient wall portion which will vibrate when a force is impinged thereupon. Also, within the broader aspects of this invention the particular means for causing vibration of the wall portion need not necessarily be a coil transducer and the pick-up means need not necessarily be a microphone. It is possible that a mechanism can be set up wherein the vibrations are created by a mechanical means and the pick-up is something akin to a tuning fork.

Therefore, although I have shown a preferred embodiment of my invention, it should be understood that there are many other modifications and embodiments all of which come within the spirit of my invention. Accordingly, this invention should be limited only as set forth in the following claims.

I claim:
1. Apparatus for determining fluid pressure of a space enclosed within an enclosure having at least a flexible wall portion comprising: a transducer coil; a source of oscillating power connected to said coil said source of oscillating power having at least one frequency falling within a range of predetermined frequencies; means for positioning said coil above the surface of a resilient wall for creating an oscillating magnetic force on the wall causing said wall to flex at a rate within said predetermined range of frequencies; pick-up means adjacent said transducer coil for producing signals in response to the acoustic energy generated by the wall as vibrated by said magnetic force, said pickup means including an acoustic microphone and circuit means for connecting the sound waves into corresponding electrical signals; and frequency discriminating means for receiving and discriminating said signals within a predetermined range of frequencies to indicate the resonant frequency of the wall over which said coil is positioned.

2. Apparatus for determining fluid pressure of a space enclosed within an enclosure having at least a flexible wall portion comprising: a transducer coil; a source of frequency modulated power connected to said coil said source of oscillating power having at least one frequency falling within a range of predetermined frequencies; means for positioning said coil above the surface of a resilient wall for creating an oscillating magnetic force on the wall causing said wall to flex at a rate within said predetermined range of frequencies to flex it; pick-up means adjacent said transducer coil for producing signals in response to the vibrating energy generated by the wall as flexed by said magnetic force; and a plurality of separate means each operating within a predetermined range of frequencies for indicating the frequency vibration characteristics of the wall over which said coil is positioned.

3. Apparatus for determining fluid pressure of a space enclosed within an enclosure having at least a flexible wall portion comprising: a transducer coil; a source of oscillating power connected to said coil said source of oscillating power having at least one frequency falling within a range of predetermined frequencies; means for positioning said coil above the surface of a resilient wall for creating an oscillating magnetic force on the wall causing said wall to flex at a rate within said predetermined range of frequencies; a pick-up means above said coil for producing signals in response to the vibration energy generated by the wall as flexed by said magnetic force; said coil and pick-up means being located within an elongated housing; and frequency discriminating means for receiving and discriminating said signals within a predetermined range of frequencies to indicate the resonant frequency of the wall over which said coil is positioned.

4. Apparatus for determining fluid pressure of a space enclosed within an enclosure having at least a flexible wall portion comprising: a transducer coil; a source of frequency modulated power connected to said coil said source of oscillating power having at least one frequency falling within a range of predetermined frequencies for creating an oscillating magnetic force on the wall causing said wall to flex at a rate within said predetermined range of frequencies; a pick-up means above said coil for producing signals in response to the vibration energy generated by the wall as flexed by said magnetic force; said coil and pick-up means being mounted within an elongated housing; said elongated housing being adjustable in length with said pick-up means mounted near the top thereof and the coil near the bottom thereof; and frequency discriminating means for receiving and discriminating said signals within a predetermined range of frequencies to indicate the resonant frequency of the wall over which said coil is positioned.

5. Apparatus for determining fluid pressure of a space enclosed within an enclosure having at least a flexible wall portion comprising: a transducer coil; a source of oscillating power connected to said coil; means for positioning said coil above the surface of a resilient wall for creating an oscillating magnetic force on the wall; pickup means adjacent said transducer coil for producing signals in response to the vibrating energy generated by the wall as flexed by said magnetic force; a narrow band pass amplifier for amplifying signals falling within a certain band of frequencies; said source of oscillating power being operated at frequencies to produce flexing of said wall such that said wall vibrates within said band of frequencies if a predetermined vacuum exists within said enclosure; and indicating means connected to the output of said amplifier and responsive to amplification of signals falling within said band of frequencies.

6. Apparatus for determining the fluid pressure of a space enclosed within an enclosure having at least a flexible wall portion comprising:
   means for vibrating said flexible wall by flexing it at a specified frequency;
   means for converting sound waves emitted by the vibrating flexible wall into electrical signals; and
   frequency classification means for determining whether the electrical signals fall within a predetermined frequency range.

7. Apparatus for determining the fluid pressure of a space enclosed within an enclosure having at least a flexible wall portion comprising:
- means for vibrating said flexible wall by flexing it at a specified frequency;
- means for continuously converting sound waves emitted by the vibrating flexible wall into electrical signals;
- frequency classification means for selecting electrical signals falling within a predetermined frequency range; and
- means responsive to said electrical signals falling within said predetermined frequency range for giving an indication of the pressure or vacuum within said space.

8. Apparatus for determining the fluid pressure of a space enclosed within an enclosure having at least a flexible wall portion comprising:
- means for flexing said flexible wall by subjecting it to a continuous vibrating source of a selected frequency;
- means for continuously converting any sound waves emitted by the flexible wall into electrical signals;
- frequency classification means for selecting the electrical signals falling within a predetermined frequency range; and
- means responsive to said electrical signals falling within said predetermined frequency range for giving an indication of the pressure or vacuum within said space.

9. The apparatus as set forth in claim 7 in which said means for converting comprises an acoustical microphone.

10. Apparatus for determining the fluid pressure of a space enclosed within an enclosure having at least a flexible wall portion comprising:
- frequency modulated means for vibrating said flexible wall by flexing it throughout a predetermined range of frequencies;
- means for converting sound waves emitted by the vibrating flexible wall into electrical signals; and
- frequency discrimination means including band pass amplifier means for determining the frequency range of said electrical signals.

11. The apparatus as set forth in claim 10 in which said means for converting comprises an acoustical microphone.

12. A method of determining the fluid pressure of a space enclosed by an enclosure having at least a flexible wall portion comprising the steps of:
- flexing said wall at a specified frequency causing it to vibrate;
- continuously converting the sound waves emitted by the vibrating wall into electrical signals;
- selecting the electrical signals falling within a predetermined frequency range; and
- indicating the pressure of vacuum within said space from said electrical signals falling within said predetermined frequency range.

13. A method of determining the fluid pressure of a space enclosed by an enclosure having at least a flexible wall portion comprising the steps of:
- flexing said wall by subjecting it to a continuous flexing force of a selected frequency;
- continuously converting any sound waves emitted by said wall into electrical signals;
- selecting electrical signals falling within a predetermined frequency range; and
- indicating the pressure or vacuum within said space from said electrical signals falling within said predetermined frequency range.

14. A method of determining the fluid pressure of a space enclosed by an enclosure having at least a flexible wall portion comprising the steps of:
- vibrating said flexible wall by flexing it throughout a predetermined range of frequencies;
- continuously converting the sound waves emitted by the vibrating flexible wall into electrical signals; and
- discriminating said electrical signals according to their frequencies.

References Cited by the Examiner

UNITED STATES PATENTS

| | | | |
|---|---|---|---|
| 2,320,390 | 6/1943 | Shumark | 73—52 |
| 2,735,292 | 2/1956 | Apps | 73—69 |

LOUIS R. PRINCE, *Primary Examiner.*

D. O. WOODIEL, *Assistant Examiner.*